(12) United States Patent
Suguro et al.

(10) Patent No.: US 9,786,952 B2
(45) Date of Patent: Oct. 10, 2017

(54) LITHIUM SECONDARY CELL INCLUDING AN ELECTROLYTIC SOLUTION INCLUDING CYCLIC ACID ANHYDRIDES

(75) Inventors: Masahiro Suguro, Tokyo (JP); Midori Shimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 82 days.

(21) Appl. No.: 14/127,145

(22) PCT Filed: Jun. 22, 2012

(86) PCT No.: PCT/JP2012/065982
§ 371 (c)(1),
(2), (4) Date: Dec. 17, 2013

(87) PCT Pub. No.: WO2012/176873
PCT Pub. Date: Dec. 27, 2012

(65) Prior Publication Data
US 2014/0120415 A1    May 1, 2014

(30) Foreign Application Priority Data

Jun. 23, 2011  (JP) ................................. 2011-139722
Jun. 6, 2012  (JP) ................................. 2012-129054

(51) Int. Cl.
  *H01M 10/0567*  (2010.01)
  *H01M 10/052*   (2010.01)
  *H01M 10/0585*  (2010.01)

(52) U.S. Cl.
  CPC ..... *H01M 10/0567* (2013.01); *H01M 10/052* (2013.01); *H01M 10/0585* (2013.01);
  (Continued)

(58) Field of Classification Search
  None
  See application file for complete search history.

(56) References Cited

U.S. PATENT DOCUMENTS

| 5,296,319 A | 3/1994 | Bito et al. |
| 2004/0146786 A1 | 7/2004 | Sato et al. |

(Continued)

FOREIGN PATENT DOCUMENTS

| JP | 2697365 B2 | 1/1998 |
| JP | 2003-123740 A | 4/2003 |

(Continued)

OTHER PUBLICATIONS

International Search Report (ISR) (PCT Form PCT/ISA/210), in PCT/JP2012/065982, dated Sep. 11, 2012.
(Continued)

*Primary Examiner* — Patrick Ryan
*Assistant Examiner* — Zhongqing Wei
(74) *Attorney, Agent, or Firm* — McGinn IP Law Group, PLLC.

(57) ABSTRACT

An object of the present invention is to provide a high-capacity, long-life lithium secondary cell suppressing a reduction in capacity particularly with respect to use under a high-temperature environment, and having improved cycle properties. The lithium secondary cell comprises a positive electrode active material layer containing a positive electrode active material, a negative electrode active material layer containing a silicon-based material as a negative electrode active material, and an electrolytic solution in which the positive electrode active material layer and the negative electrode active material layer are immersed, the electrolytic solution contains one or more of specific cyclic acid anhydrides.

6 Claims, 1 Drawing Sheet

(52) U.S. Cl.
CPC ........ *H01M 2220/20* (2013.01); *Y02E 60/122* (2013.01); *Y02T 10/7011* (2013.01)

(56) References Cited

U.S. PATENT DOCUMENTS

| | | |
|---|---|---|
| 2006/0228625 A1 | 10/2006 | Kawashima |
| 2011/0008673 A1* | 1/2011 | Ugaji .................. H01M 4/134 429/188 |

FOREIGN PATENT DOCUMENTS

| | | |
|---|---|---|
| JP | 2004-047404 A | 2/2004 |
| JP | 2006-294373 A | 10/2006 |
| JP | 2007-317647 A | 12/2007 |
| JP | 2008-153117 A | 7/2008 |
| JP | 2008-192488 A | 8/2008 |
| JP | 2011-049153 A | 3/2011 |
| JP | 2011-060464 A | 3/2011 |
| WO | WO 02/093679 A1 | 11/2002 |
| WO | WO 2010/092815 A1 | 8/2010 |

OTHER PUBLICATIONS

Japanese Decision of Rejection, dated Feb. 7, 2017, in Japanese Application No. 2013-521627 and English Translation thereof.

* cited by examiner

LITHIUM SECONDARY CELL INCLUDING AN ELECTROLYTIC SOLUTION INCLUDING CYCLIC ACID ANHYDRIDES

TECHNICAL FIELD

The present invention relates to a high-capacity, long-life lithium secondary cell having excellent cycle property particularly regarding use under high-temperature environments.

BACKGROUND ART

Lithium secondary cells are widely used for portable electronic devices, personal computers, and so on. Therefore, there are needs for advanced miniaturization and weight lightening in such a lithium secondary cell, as well as increased energy densities for highly-functional electronic devices and long-life and reduced cycle deterioration during charge/discharge. Such a lithium secondary battery has a structure configured by opposite-disposing a negative electrode active material layer having a negative electrode active material formed on a current collector and a positive electrode active material layer having a positive electrode active material formed on a current collector therebetween a separator, filling an electrolytic solution to immerse them, and sealing the outer body within an outer body wherein the negative electrode active material and positive electrode active material are capable of absorbing and releasing reversibly lithium ions during charging/discharging.

As this kind of negative electrode active material, in terms of a high energy density, a low cost and safety, silicon, silicon oxide, metals such as tin forming an alloy with lithium, and metal oxides instead of carbon-based material are used. However, in a case of a negative electrode active material layer containing silicon, expansion and contraction in volume according to charge and discharge are large, and according to repetition of charge and discharge due to reaction with an electrolytic solution, falling of fine powder from the negative electrode active material layer, or the like may occur, resulting in a reduction in the capacity of a cell. Particularly, in a case of a cell using silicon or silicon oxide as a negative electrode active material, if the cell is used under a high-temperature environment of 45° C. or more, a reduction in the capacity of the cell is large and in a stacked laminate type cell, deterioration tends to be remarkable.

In order to suppress this deterioration according to charge and discharge, there have been reported a negative electrode using carbon material particles, silicon particles, and silicon oxide particles as negative electrode active materials (Patent Document 1), a negative electrode using particles having carbon coating films on the surfaces of silicon dioxide particles in which silicon is dispersed, as a negative electrode active material (Patent Document 2), and so on.

Meanwhile, in order to improve cycle property, specific materials have been added in electrolytic solutions. As specific examples of these additives, there have been reported benzoic anhydride, phthalic anhydride, maleic anhydride (Patent Document 3), specific succinic anhydride or the like (Patent Document 4), and specific maleic acid derivatives or the like (Patent Documents 5 and 6).

With respect to lithium secondary cells, it is required to increase capacities, suppress reductions in capacities with respect to use under high-temperature environments, improve cycle properties, and increase lives.

CITATION LIST

Patent Document

Patent Document 1: Japanese Patent Application Laid-Open No. 2003-123740
Patent Document 2: Japanese Patent Application Laid-Open No. 2004-47404
Patent Document 3: Japanese Patent No. 2697365
Patent Document 4: Japanese Patent Application Laid-Open No. 2006-294373
Patent Document 5: Japanese Patent Application Laid-Open No. 2011-60464
Patent Document 5: Japanese Patent Application Laid-Open No. 2007-317647

SUMMARY OF THE INVENTION

An object of the present invention is to provide a high-capacity, long-life lithium secondary cell suppressing a reduction in capacity particularly with respect to use under a high-temperature environment.

The present invention relates to a lithium secondary cell including a positive electrode active material layer containing a positive electrode active material, a negative electrode active material layer containing a negative electrode active material, and an electrolytic solution in which the positive electrode active material layer and the negative electrode active material layer are immersed, wherein the electrolytic solution contains one or more cyclic acid anhydrides which are selected from a cyclic acid anhydride represented by Chemical Formula 1, a cyclic acid anhydride represented by Chemical Formula 2, a cyclic acid anhydride represented by Chemical Formula 3, and a cyclic acid anhydride represented by Chemical Formula 4.

[Chemical Formula 1]

(1)

(wherein $R^1$ and $R^2$ independently represent a hydrogen atom, a halogen atom, an unsubstituted or substituted 1-12C hydrocarbon group, an unsubstituted or substituted 1-12C alkoxy group, or an unsubstituted or substituted alkylamino group.)

[Chemical Formula 2]

(2)

(wherein $R^3$ to $R^6$ independently represent a hydrogen atom, a halogen atom, or an unsubstituted or substituted 1-12C hydrocarbon group, and b represents any one integer of 1 to 12.)

[Chemical Formula 3]

(3)

(wherein $R^7$ to $R^9$ independently represent a hydrogen atom, a halogen atom, or an unsubstituted or substituted 1-12C hydrocarbon group.)

[Chemical Formula 4]

(4)

(wherein $R^{10}$ and $R^{11}$ independently represent a hydrogen atom, a halogen atom or an unsubstituted or substituted 1-12C alkyl group.)

Advantage of the Invention

The lithium secondary cell of the present invention has a high capacity, a long life, and improved cycle property, and suppresses a reduction in the capacity, particularly, with respect to use under high-temperature environments.

DESCRIPTION OF THE INVENTION

A lithium secondary cell of the present invention includes a positive electrode active material layer containing a positive electrode active material, a negative electrode active material layer containing a negative electrode active material, and an electrolytic solution in which the positive electrode active material layer and the negative electrode active material layer are immersed.

[Negative Electrode Active Material Layer]

It is preferable that the negative electrode active material layer should include a negative electrode active material capable of reversibly occluding and releasing lithium ions according to charge and discharge, and have a structure in which the negative electrode active material is bound on a negative current collector by a binder.

The negative electrode active material is not especially limited. It is preferable to use a silicon-based material. Examples of the silicon-based material can include silicon simple substance, silicon oxide, silicate, silicon compounds of silicon and a transition metal such as nickel or cobalt, or the like. The silicon compounds have a role in absorbing expansion and contraction of the negative electrode active material with respect to repeated charge and discharge, and thus are preferable as the negative electrode active material. Further, some kinds of silicon compounds have a role in promoting conduction between silicon, and from this viewpoint, silicon oxide is preferable as a silicon compound. The silicon oxide is represented by $SiO_x$ (0<x<2), and can include SiO, $SiO_2$, or the like, as specific examples. The silicon oxide is unlikely to react with the electrolytic solution, and thus can stably exist in the negative electrode material layer. The silicon oxide may contain Li and be represented, for example, by $SiLi_yO_z$, (wherein y>0, and 2>z>0). Further, it is preferable that silicon oxide should contain atoms of one or more kinds selected from nitrogen, boron, and sulfur, since it is possible to suppress a reduction in the electric conduction property of the negative electrode active material layer and it is possible to advance a current collection rate. It is preferable that the content of atoms of one or more kinds selected from nitrogen, boron, and sulfur, in silicon oxide should be 0.1 to 5 weight percent, since a reduction in the energy density of the negative electrode active material layer is suppressed, and an improvement of the current collection rate is advanced.

Also, silicon-based materials preferably contain both of silicon simple substance and a silicon compound, and it is more preferable that the silicon compound contains the silicon oxides. These materials have different charge/discharge potential against the lithium ion, specifically, charge/discharge potential of silicon against the lithium ion is lower than that of silicon oxide. Therefore, in the negative electrode active material layer containing them, it is possible to gradually release lithium ions accompanying of voltage during discharge, that enables the negative electrode active material layer to avoid rapid contraction of the volume due to simultaneous release of lithium ions at a specific potential.

A method of producing a negative electrode active material containing silicon simple substance and silicon oxides, for example, comprises mixing silicon simple substance and silicon oxides and sintering the mixture under high-temperature and reduced-pressure conditions. A method of producing a negative electrode active material containing compounds of a transition metal and silicon simple substance exemplifies a method of mixing and melting silicon simple substance and a transition metal, or a method of coating the surfaces of particles of silicon simple substance with a transition metal by deposition.

Also the negative electrode active material preferably contains a carbon material since its cycle property and safety are high and its continuous charging characteristic is also excellent. As examples of the carbon material, coke, acetylene black, mesophase microbead, or the like can be preferable. Further, it is also possible to appropriately use a material obtained by coating those carbon materials with an organic material, thereafter sintering, or forming amorphous carbon coating on the surfaces of the particles of the carbon materials by CVD or the like. Here the organic material for the amorphous carbon coating exemplifies coal tar pitch from soft pitch to hard pitch, carboniferous heavy oil such as distilled liquid oil, distilled heavy oil such as atmospheric residual oil or vacuum residual oil, or petroleum heavy oil such as cracked heavy oil, for example, ethylene heavy end, secondarily produced by thermally cracking crude oil, naphtha, or the like. Also, it is possible to use a material obtained by grinding solid residues, obtained by distilling those oils at 200° C. to 400° C., to 1 µm to 100 µm. Further, for coating of carbon materials, it is possible to use vinyl chloride resin, phenol resin, imide resin, or the like.

The negative electrode active material preferably contains a carbon material in addition to silicon and silicon oxide since expansion and contraction in volume accompanied charge and discharge of the negative electrode active material is absorbed and electrical conductivity is secured. The carbon material which is used together with silicon and silicon oxide is exemplified black lead, amorphous carbon, diamond-like carbon, carbon nanotubes, or the like. Black lead having high crystallinity has high and flat electrical conductivity and excellent adhesive property with a current collector. Meanwhile, amorphous carbon having low crystallinity can suppress deterioration of the negative electrode active material layer accompanied charge and discharge since a variation in volume accompanied charge and discharge is small. It is preferable that the contents of silicon and silicon oxide in the negative electrode active material may be 5 to 90 weight percent, and more preferable 40 or more weight percent and 70 or less weight percent. It is preferable that the content of the carbon material may be 2 or more weight percent and 50 or less weight percent and more preferable 2 or more weight percent and 30 or less weight percent.

In the above described case using silicon, silicon oxide, the carbon material as particles, the particle whose variation in volume accompanied charge and discharge is larger has preferably a smaller diameter, since it is possible to suppress a variation in the volume of the negative electrode active material layer according to variations in the volumes of those particles. Specifically, it is preferable that the average particle diameter of silicon oxide may be smaller than the average particle diameter of the carbon material, for example, the average particle diameter of silicon oxide is equal to or less than ½ of the average particle diameter of the carbon material. It is preferable that the average particle diameter of silicon may be smaller than the average particle diameter of silicon oxide, for example, the average particle diameter of silicon is equal to or less than ½ of the average particle diameter of silicon oxide. If the particles have such average diameters, it is possible to obtain a secondary cell having a large effect of absorbing a variation in the volume of the negative electrode active material layer and excellent balance of efficiency with an energy density and a cycle life. Specifically, the average particle diameter of silicon is preferably, for example, 20 µm or less and more preferably 15 µm or less, since it enables the silicon particle to secure contact with a current collector.

In the case of containing the carbon material together with silicon and silicon oxide as the negative electrode active material, silicon, silicon oxide, and the carbon material may be contained as individual particles; however, it is preferable that they make a complex. As the complex, it is preferable that silicon oxide may exist around the cluster of silicon, and the surface thereof may be coated by carbon. In the complex, it is preferable that at least a portion of silicon oxide may have an amorphous structure. Since silicon oxide has an amorphous structure, it can be considered that there are some effects in which defects included in the crystal structure or elements attributable to unevenness of grain boundaries are reduced, and uneven variations in the volume of the complex is suppressed, and formation of coating films on the surface of particle of the carbon material is promoted. Further, it is possible to suppress pulverization of the negative electrode active material layer and to suppress reaction with the electrolytic solution. The amorphous structure of silicon oxide can be confirmed from the fact that the unique peak which is observed in a case of having a crystal structure by X-ray diffraction measurement (general XRD measurement) becomes broad.

As the above described complex, a complex in which all or a portion of silicon is dispersed in silicon oxide is preferable. Since at least a portion of silicon is dispersed in silicon oxide, it is possible to further suppress expansion of the volume of the entire negative electrode, and also to suppress decomposition of the electrolytic solution. The average particle diameter of silicon dispersed in silicon oxide, several nanometers to several hundreds nanometers can be exemplified. The particle diameter can be measured by transmission electron microscope (TEM) observation. Dispersion of silicon in silicon oxide can be confirmed by transmission electron microscope observation (general TEM observation) and energy dispersive X-ray spectroscopy measurement (general EDX measurement) together. Specifically, dispersion of silicon in silicon oxide can be confirmed by observing the cross section of a sample, and measuring the oxygen concentration of a silicon portion dispersed in silicon oxide so as to confirm that oxygen is not contained.

The content of silicon in the above described complex is preferably 5 or more weight percent and 90 or less weight percent, more preferably 20 or more weight percent and 50 or less weight percent. The content of silicon oxide in the complex is preferably 5 or more weight percent and 90 or less weight percent, more preferably 40 or more weight percent and 70 or less weight percent. The content of the carbon material in the complex is preferably 2 or more weight percent and 50 or less weight percent, more preferably 2 or more weight percent and 30 or less weight percent.

As a method of producing the complex with carbon coating films in which silicon is dispersed in silicon oxide of the above described amorphous structure, a method of mixing particulate silicon oxide, silicon, and the carbon material in the state of particle by mechanical milling can be exemplified. Also, it is possible to produce the complex by a method of introducing the sintered mixture of silicon and silicon oxide into gaseous atmosphere of an organic compound under a high-temperature non-oxygen atmosphere, or a method of mixing the sintered mixture of silicon and silicon oxide and a carbon precursor resin under a high-temperature non-oxygen atmosphere. For those methods, particles having average particle diameters as described above can be used.

The surface of the complex described above may be treated by a silane coupling agent.

Further, the negative electrode active material may contain a metal other than silicon, or a metal oxide. The metals other than silicon are preferably capable of forming an alloy with lithium. That is able to release lithium ions from a lithium alloy during discharge and form a lithium alloy during charge. Specifically, aluminum, lead, tin, indium, bismuth, silver, barium, calcium, mercury, palladium, platinum, tellurium, zinc, or lanthanum can be exemplified. From these, one or more kinds can be selected. Of them, tin is preferable.

As the metal oxide of the negative electrode active material, specifically, aluminum oxide, tin oxide, indium oxide, zinc oxide, or lithium oxide can be exemplified, and one kind or a combination of two or more kinds of them can be used. It is preferable to use these metal oxides together with the above described metals, particularly, together with metals contained in the metal oxides since occlusion and release of lithium ions are performed at different potentials during charge and discharge and it inhibits a rapid variation in the volume of the negative electrode active material layer. Tin oxide is preferably used together with the above described tin.

It is preferable that at least a portion of each of these metal oxides may have an amorphous structure. If a metal oxide has an amorphous structure, it is possible to suppress pulverization of the negative electrode active material layer and to suppress reaction with the electrolytic solution. The negative electrode active material layer having the amorphous structure can be considered that defects included in the crystal structure or elements attributable to unevenness of grain boundaries are reduced, and uneven variations in the volume is suppressed. Also, it is preferable that a metal contained in a metal oxide described above may be dispersed in the metal oxide.

The particle diameters of the negative electrode active material are not especially limited. In view of excellent cell characteristics such as initial charge efficiency, a rate characteristic, and a cycle characteristic, the particle diameter is generally 1 µM or more, preferably 15 µm or more, and 50 µm or less, preferably, 30 µm or less.

As the above described negative electrode binder for binding the negative electrode active material, for example, polyvinylidene fluoride (PVdF), vinylidene fluoride-hexafluoropropylene copolymer, vinylidene fluoride-tetrafluoroethylene copolymer, styrene-butadiene rubber, polytetrafluoroethylene, polypropylene, polyethylene, polyimide, polyamide imide, polyacrylic acid or the salt thereof, carboxymethyl cellulose or the salt thereof, or the like can be used. These binders can be used either singly or as a combination of two or more binders. From the viewpoint of binding strength, it is preferable that they may contain polyimide, polyamide imide, polyacrylic acid (containing lithium salt, sodium salt, or potassium salt neutralized by an alkali), carboxymethyl cellulose (containing lithium salt, sodium salt, or potassium salt neutralized by an alkali). From a viewpoint of sufficient binding strength and high energy having a trade-off relation, it is preferable that the amount of the binder for the negative electrode to be used may be 5 to 25 parts by mass with respect to 100 parts by mass of the negative electrode active material.

The negative current collector needs to support the negative electrode active material layer containing the negative electrode active material integrally bound by the binder and have electrical conductivity enabling conduction with an external terminal, and in view of electrochemical stability, it is possible to use copper, nickel, SUS, or the like. From ease of processing and cost, of them, copper is preferable. It is preferable to roughen the current collector in advance. As the shape of the current collector, foil, a flat plate shape, a mesh shape, perforated type such as an expand metal or punching metal, or the like can be exemplified.

As a method of forming the above described negative electrode, it is possible to form the negative electrode by coating the negative current collector with a coating liquid for the negative electrode produced as slurry by dissolving the negative electrode active material and the binder for the negative electrode, and drying the negative current collector. As the coating method, a doctor blade method, a die coater method, or the like can be exemplified. Also, it is possible to use a material for the negative electrode active material layer to form the negative electrode by a CVD method, a sputtering method, or the like, and it is possible to use a material for the negative electrode active material to form the negative electrode as a sheet electrode by roll forming, or to form the negative electrode as a pellet electrode by compression molding. After the negative electrode active material layer is formed in advance, a thin film of aluminum, nickel, or an alloy thereof may be formed as a negative current collector by a method such as deposition or sputter

[Positive Electrode Active Material Layer]

It is preferable that the positive electrode active material layer should contain the positive electrode active material and have a structure in which the positive electrode active material is bound on the positive current collector by a binder for the positive electrode.

The positive electrode active material releases lithium ions into the electrolytic solution during charge, and occludes lithium from the electrolytic solution during discharge, and examples of the positive electrode active material can include lithium manganate such as $LiMnO_2$ or $Li_xMn_2O_4$ ($0<x<2$) having a layered structure or lithium manganate having a spinel structure, $LiCoO_2$, $LiNiO_2$, or materials obtained by substituting portions of these transition metals with other metals, lithium transition metal oxides in which numbers of specific transition metals does not exceed a half number of transition metals such as $LiNi_{1/3}Co_{1/3}Mn_{1/3}O_2$, or these lithium transition metal oxides containing Li in an excessively larger amount than the stoichiometric composition. Particularly, $Li_\alpha Ni_\beta Co_\gamma Al_\delta O_2$ ($1 \leq \alpha \leq 1.2$, $\beta+\gamma+\delta=1$, $\beta \geq 0.7$, and $\gamma \leq 0.2$), or $Li_\alpha Ni_\beta Co_\gamma Mn_\delta O_2$ ($1 \leq \alpha 1.2$, $\beta+\gamma+\delta=1$, $\beta \geq 0.6$, and $\gamma \leq 0.2$) is preferable. The positive electrode active materials can be used alone or in combination of two or more kinds.

As the positive electrode binder for integrally binding the above described positive electrode active material, the same compounds as mentioned as the negative electrode binder can be used. As the positive electrode binder, in view of general versatility and low cost, polyvinylidene fluoride is preferable. The amount of positive electrode binder to be used is preferably 2 to 10 parts by mass relative to 100 parts by mass of the positive electrode active material. If the content of the positive electrode binder is 2 parts by mass or more, the adhesive property of the active materials or the active materials and the current collectors is improved, and the cycle characteristic becomes good, and if the content of the positive electrode binder is 10 parts by mass or less, the active material ratio is suppressed to be low, and it is possible to improve the positive electrode capacity.

In order to reduce the impedance of the positive electrode active material, a conductive aid may be added to the above described positive electrode active material layer. As the conductive aid, it is possible to use carbonaceous fine particles of graphite, carbon black, acetylene black, or the like.

The positive current collector should support the positive electrode active material layer containing the positive electrode active material integrally bound by the binder and have electrical conductivity enabling conduction with an external terminal, and specifically, in addition to the materials for the negative current collector, aluminum, silver, or the like can be used.

The above described positive electrode can be formed of a material for the positive electrode active material layer containing the positive electrode active material and the binder for the positive electrode, on the positive current collector. As the method of forming the positive electrode active material layer, the same method as the method of negative electrode active material layer can be applied.

[Electrolytic Solution]

The electrolytic solution is a solution obtained by dissolving an electrolyte in a nonaqueous organic solvent in which the positive electrode and the negative electrode can be immersed to dissolve lithium ions in order to enable occlusion and release of lithium at the positive electrode and the negative electrode during charge and discharge.

It is preferable that the solvent of the electrolytic solution should be stable at the operation potential of the cell and have low viscosity such that it is possible to immerse the electrodes in the usage environment of the cell. Specific examples of the solvent which is non-protonic organic solvent can include cyclic carbonates such as ethylene carbonate (EC), propylene carbonate (PC), butylene carbonate (BC), or vinylene carbonate (VC); chained carbonates such as dimethyl carbonate (DMC), diethyl carbonate (DEC), ethylmethyl carbonate (EMC), or dipropyl carbonate (DPC); propylene carbonate derivatives; aliphatic carboxylic acid esters such as methyl formate, methyl acetate, or ethyl propionate. These can be used alone or in combination of two or more kinds. Of them, cyclic or chained carbonates such as ethylene carbonate (EC), propylene carbonate (PC), butylene carbonate (BC), vinylene carbonate (VC), dimethyl carbonate (DMC), diethyl carbonate (DEC), ethylmethyl carbonate (EMC), or dipropyl carbonate (DPC) are preferable.

It is more preferable that the above described solvent may contain a fluorinated ether compound. The fluorinated ether compound has high affinity with silicon, and improves the cycle characteristic, especially, the capacity maintenance rate of the cell. The fluorinated ether compound may be a fluorinated chain ether compound produced by substituting a portion of hydrogen of a non-fluorinated chain ether compound with fluorine, or a fluorinated cyclic ether compound produced by substituting a portion of hydrogen of a non-fluorinated cyclic ether compound with fluorine.

Examples of the non-fluorinated chain ether compound can include non-fluorinated chain monoether compounds such as dimethyl ether, methylethyl ether, diethyl ether, methyl propyl ether, ethyl propyl ether, dipropyl ether, methyl butyl ether, ethyl butyl ether, propyl butyl ether, dibutyl ether, methyl pentyl ether, ethyl pentyl ether, propyl pentyl ether, butyl pentyl ether, or dipentyl ether; non-fluorinated chain diether compounds such as 1,2-dimethoxy ethane (DME), 1,2-diethoxy ethane (DEE), ethoxy methoxy ethane (EME), 1,2-dipropoxy ethane, propoxy ethoxy ethane, propoxy methoxy ethane, 1,2-dibutoxy ethane, butoxy propoxy ethane, butoxy ethoxy ethane, butoxy methoxy ethane, 1,2-dipentoxy ethane, pentoxy butoxy ethane, pentoxy propoxy ethane, pentoxy ethoxy ethane, or pentoxy methoxy ethane.

Examples of the non-fluorinated cyclic ether compound can include non-fluorinated cyclic monoether compounds such as ethylene oxide, propylene oxide, oxetane, tetrahydrofuran, 2-methyltetrahydrofuran, 3-methyltetrahydrofuran, tetrahydropyran, 2-methyltetrahydropyran, 3-methyltetrahydropyran, or 4-methyltetrahydropyran; non-fluorinated cyclic diether compounds such as 1,3-dioxolane, 2-methyl-1,3-dioxolan, 4-methyl-1,3-dioxolan, 1,4-dioxane, 2-methyl-1,4-dioxane, 1,3-dioxane, 2-methyl-1,3-dioxane, 4-methyl-1,3-dioxane, 5-methyl-1,3-dioxane, 2,4-dimethyl-1,3-dioxane, or 4-ethyl-1,3-dioxane.

Of there, the fluorinated chain ether compound good in stability is more preferable. As the fluorinated chain ether compound, a compound expressed by $H\text{—}(CX^1X^2\text{—}CX^3X^4)_n\text{—}CH_2O\text{—}CX^5X^6\text{—}CX^7X^8\text{—}H$ is preferable. In the formula, n represents 1, 2, 3, or 4, and $X^1$ to $X^8$ independently represent a fluorine atom or a hydrogen atom. However, at least one of $X^1$ to $X^4$ represents a fluorine atom, and at least one of $X^5$ to $X^8$ represents a fluorine atom.

As the electrolyte to be contained in the electrolytic solution, lithium salt is preferable. Specific examples of lithium salt can include $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_3$, $LiN(CF_3SO_2)_2$, etc.

As the concentration of the electrolyte in the electrolytic solution is preferably 0.01 mol/L or more and 3 mol/L or less, and is more preferably 0.5 mol/L or more and 1.5 mol/L or less. If the electrolyte concentration is within this range, it is possible to attain an improvement in safety, and to obtain a reliable cell contributing to a reduction in environmental load.

The above described electrolytic solution contains one or more cyclic acid anhydrides which are selected from a cyclic acid anhydride having an unsaturated bond represented by Chemical Formula 1, a cyclic acid anhydride represented by Chemical Formula 2, a cyclic acid anhydride represented by Chemical Formula 3, and a cyclic acid anhydride represented by Chemical Formula 4, which have unsaturated bonds. The unsaturated bonds of these cyclic acid anhydrides become radicals, and polymerization reaction progresses, whereby a coating film is formed of the polymer on the negative electrode active material layer. This polymer coating film passes lithium ions and prevents permeation of the solvent of the electrolytic solution. Therefore, it is possible to suppress reaction between the negative electrode active material layer and the electrolytic solution, and to suppress a reduction in the capacity of the cell according to repeated charge and discharge.

The cyclic acid anhydride represented by Chemical Formula 1 is a maleic anhydride derivative.

[Chemical Formula 5]

(1)

In Chemical Formula 1, $R^1$ and $R^2$ independently represent a hydrogen atom, a halogen atom, an unsubstituted or substituted 1-12C hydrocarbon group, an unsubstituted or substituted 1-12C alkoxy group, or an unsubstituted or substituted alkylamino group. As the halogen atoms, fluorine atoms or chlorine atoms are preferable. The 1-12C hydrocarbon group is preferably a linear or branched alkyl group, and the 1-12C hydrocarbon groups of $R^1$ and $R^2$ may be bonded to form a ring. As a subsistent group of the 1-12C hydrocarbon group, an unsaturated carbon-carbon bond, a halogen atom such as a fluorine atom or a chlorine atom, or the like are preferable. The 1-12C alkoxy group may be linear or branched, and as a subsistent group thereof, a halogen atom of fluorine, chlorine, an oxy group, a cyano group, a nitro group, or the like is preferable. As the alkylamino group, a group having 1-6C linear or branched alkyl groups is preferable, and two alkyl groups bonded to nitrogen atoms may be bonded to from a ring. Appropriate examples of a subsistent group of the alkylamino group can include an oxy group.

As the cyclic acid anhydride represented by Chemical Formula 1, specifically, examples represented by Chemical Formulae 5 to 25 can be exemplified.

[Chemical Formula 6]

(5)

(6)

(7)

(8)

(9)

(10)

(11)

(12)

(13)

(14)

(15)

(16)

(17)

(18)

(19)

(20)

-continued (21)

(22)

(23)

(24)

(25)

The cyclic acid anhydride represented by Chemical Formula 2 is a succinic anhydride derivative.

[Chemical Formula 7]

(2)

In Chemical Formula 2, $R^3$ to $R^6$ independently represent a hydrogen atom, a halogen atom, or an unsubstituted or substituted 1-12C hydrocarbon group, and b represents any one integer of 1 to 12. The 1-12C hydrocarbon group is preferably a linear or branched alkyl group, and each $R^3$ to $R^6$ may be bonded to each other to form a ring. As a subsistent group of the 1-12C hydrocarbon group, an unsaturated carbon-carbon bond, an oxy group, a halogen atom such as a fluorine atom or a chlorine atom, or the like is preferable.

As the cyclic acid anhydride represented by Chemical Formula 2, specifically, examples represented by Chemical Formulae 26 to 35 can be exemplified.

[Chemical Formula 8]

(26)

(27)

(28)

(29)

(30)

(31)

(32)

(33)

(34)

(35)

The cyclic acid anhydride represented by Chemical Formula 3 is a succinic anhydride derivative.

[Chemical Formula 9]

(3)

In Chemical Formula 3, $R^7$ to $R^9$ each independently represent a hydrogen atom, a halogen atom, or an unsubstituted or substituted 1-12C hydrocarbon group. As the halogen atoms, fluorine atoms or chlorine atoms can be exemplified. As a subsistent group of the 1-12C hydrocarbon group, an unsaturated carbon-carbon bond, a halogen atom, or the like are preferable.

As the cyclic acid anhydride represented by Chemical Formula 3, specifically, examples represented by Chemical Formulae 36 to 39 can be exemplified.

[Chemical Formula 10]

(36)

(37)

(38)

(39)

The cyclic acid anhydride represented by Chemical Formula 4 is an aconitic acid anhydride derivative.

[Chemical Formula 11]

(4)

In Chemical Formula 4, $R^{10}$ and $R^{11}$ independently represent a hydrogen atom, a halogen atom, or an unsubstituted or substituted 1-12C alkyl group. As the halogen atoms, fluorine atoms or chlorine atoms are preferable. The 1-12C hydrocarbon group may be linear or branched, and a subsistent group thereof may include an unsaturated double bond or an unsaturated triple bond, a halogen atom such as a fluorine atom or a chlorine atom, a cyano group, a nitro group, or the like.

As the cyclic acid anhydride represented by Chemical Formula 4, specifically, examples represented by Chemical Formulae 40 to 47 can be exemplified.

[Chemical Formula 12]

(40)

(41)

(42)

(43)

(44)

(45)

(46)

(47)

The content of these cyclic acid anhydrides in the electrolytic solution may be 0.1 percent by mass or more and 2.0 percent by mass or less. If the concentration in the electrolytic solution is within this range, it is possible to form a coating film capable of passing lithium ions and suppressing contact between the solvent of the electrolytic solution and the negative electrode active material layer, on the negative electrode active material layer.

[Separator]

The separator may suppress conduction of the positive electrode and the negative electrode and have durability against the electrolytic solution without preventing permeation of charged objects. As the specific material, a finely porous polyolefin-based film of polypropylene, polyethylene, or the like, cellulose, polyethylene-telephthalate, polyimide, polyvinylidene fluoride, or the like can be used. There can be used as a porous film, fabric, non-woven fabric, or the like.

[Outer Casing of Cell]

The outer casing may have strength capable of stably holding the positive electrode, the negative electrode, the separator, and the electrolytic solution, electrochemically stable with respect to those materials, and watertightness. Specifically, for example, stainless steel, iron plated with nickel, aluminum, silica, or a laminated film obtained by coating alumina can be used, and as a resin for the laminated film, polyethylene, polypropylene, polyethylene terephthalate, or the like can be used. One or two or more of these films may be stacked. The laminated film as the outer casing is more inexpensive than metals but is likely to be deformed by an internal pressure in a case where gas is generated therein. However, if an electrolytic solution containing the above described cyclic acid anhydride, it is possible to suppress generation of gas, thereby suppressing deformation, and it is possible to secure freedom of design of the cell.

[Secondary Cell]

The shape of the secondary cell may be any one of the above described cylindrical type, a flat rectangular rolled type, a rectangular laminated type, a coin type, a flat laminated rolled type, or a laminated type. Since this secondary cell can remarkably suppress gas generation accompanied charge and discharge, it is possible to suppress deterioration of the negative electrode active material layer, and to attain a long life, and deterioration of the negative electrode active material is suppressed even in a case where the secondary cell is used especially in a high-temperature environment. A laminated-type cell tends to be deformed by generated gas in the gap between laminated electrodes. However, even if the secondary cell is used in a high-temperature environment, it is suppressed deformation and having a long life.

Figure 1:
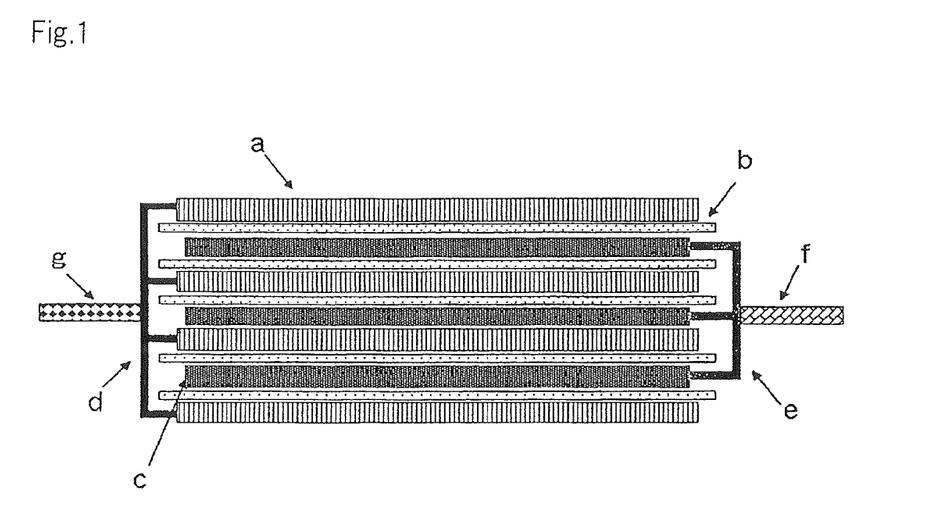
FIG. 1 is a view illustrating the configuration of an example of a lithium secondary cell of the present invention.

As an example of the above described secondary cell, a laminated-type secondary cell shown in FIG. 1 can be exemplified. In this laminated-type secondary cell, negative electrodes a having negative electrode active material layers formed of a metal such as copper foil on a negative current collector d and positive electrodes c having positive electrode active material layers formed of a metal such as aluminum foil on a positive current collector e are alternately disposed to face each other with separators b composed of finely porous polypropylene films and interposed therebetween, and these are stored inside a laminated-type outer casing (not shown). The inside of the laminated-type outer casing is filled with an electrolytic solution, and the negative electrodes a and the positive electrodes c are electrically connected at portions of the current collectors where active material layers are not formed, and a negative electrode terminal g and a positive electrode terminal f are drawn to the outside so as to be connected to an external power supply or a used device during charge and discharge.

[Vehicle]

The above described lithium secondary cell can be used as a power source for driving a motor of a vehicle. The vehicle may be any one of an electric vehicle and a hybrid vehicle.

Figure 2:
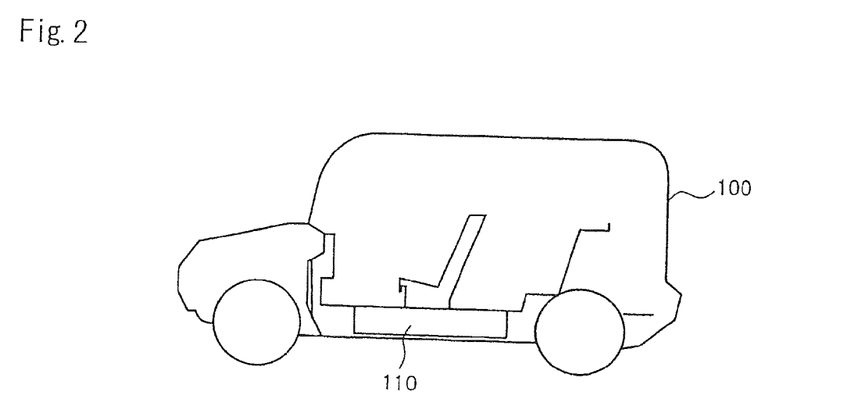
FIG. 2 is a view illustrating the configuration of an example of a vehicle using the lithium secondary cell of the present invention.
a NEGATIVE ELECTRODE
b SEPARATOR
c POSITIVE ELECTRODE
d NEGATIVE CURRENT COLLECTOR
e POSITIVE CURRENT COLLECTOR
f POSITIVE ELECTRODE TERMINAL
g NEGATIVE ELECTRODE TERMINAL
110 CELL PACK (LITHIUM SECONDARY CELL)

An example of this vehicle, a vehicle using a cell pack in which a plurality of lithium secondary cells described above is connected in series or in parallel is shown in FIG. 2. The vehicle shown in FIG. 2 has the cell pack 110 of the lithium secondary cells mounted below a seat of the central portion of the vehicle 100.

EMBODIMENTS

Hereinafter, the lithium secondary cell of the present invention will be described in detail.

Embodiment 1

[Producing of Negative Electrode]

A negative electrode active material was obtained by weighting silicon having an average particle diameter of 5 μm and black lead having an average particle diameter of 30 μm in a mass ratio of 90:10, and mixing them by so-called mechanical milling for 24 hours. This negative electrode active material having an average particle diameter D50 of 5 μm and polyimide marketed as "U vanish A" manufactured by Ube Industries, Ltd. were weighted in a mass ratio of 85:15 and were mixed with n-methylpyrrolidone, whereby negative electrode slurry was produced. The negative electrode slurry was applied on copper foil having a thickness of 10 μm, and was dried, and then thermal treatment of 300° C. in nitrogen atmosphere was performed, whereby a negative electrode was formed. Also, with respect to an embodiment using this negative electrode active material, in the section "DISPERSION OF Si IN $SiO_x$" of table 1, "N" was written.

[Formation of Positive Electrode]

Lithium nickel oxide ($LiNi_{0.80}Co_{0.15}Al_{0.15}O_2$) serving as the positive electrode active material, carbon black serving as the conductive aid, and polyvinylidene fluoride serving as the binder for the positive electrode were weighted in a mass ratio of 90:5:5, and were mixed with n-methylpyrrolidone, whereby positive electrode slurry was produced. This positive electrode slurry was applied on aluminum foil of a thickness of 20 μm, and was dried, and was pressed, whereby a positive electrode was faulted.

[Preparation of Electrolytic Solution]

A electrolytic solution was prepared by dissolving $LiPF_6$ as an electrolyte at a concentration of 1 mol/L in a carbonate-based nonaqueous solvent composed of DC and DEC at a volume ratio of 30:70, and in this electrolytic solution, 0.2 weight percent of a compound represented by Chemical Formula 8 as the cyclic acid anhydride represented by Chemical Formula 1 was mixed, whereby an electrolytic solution was prepared.

[Lithium Secondary Cell]

Three obtained positive electrodes and four obtained negative electrodes were alternately stacked to be placed a porous polypropylene films serving as separator between a positive electrode and a negative electrode. Edges of each positive current collector which was not covered by a positive electrode active material layer and edges of each negative current collector which was not covered by a negative electrode active material layer were respectively welded, and to the welded edges, a positive electrode terminal made from aluminum or a negative electrode terminal made from nickel was welded, whereby an electrode element having a planar laminated structure was obtained.

The above described electrode element was packed by a laminated aluminum film as an outer casing, and the electrolytic solution was injected into the outer casing, and the outer casing was sealed under atmospheric pressure of 0.1, whereby a second cell was formed.

[Evaluation of Charge/Discharge Cycle Characteristic]

The high-temperature cycle characteristic of the formed lithium secondary cell was measured as follows. In a thermostatic chamber maintained at 60° C., with respect to the secondary cell, charges and discharges were repeated within a voltage range from 2.5 V to 4.1 V and discharged capacities were measured after 5 cycles and 50 cycles. The ratio D50/D5 (in unit of %) was calculated to be set as a maintenance ratio, wherein D5 was a discharged capacity after 5 cycles and D50 was a discharged capacity after 50 cycles. Also, the ratio V50/V5 (in unit of %) was calculated to be set as a swelling ratio, wherein V5 was a cell volume after 5 cycles and V5 was a cell volume after 50 cycles. The result is shown in Table 1.

With respect to the maintenance ratio, 75% or more was evaluated as "A", 50% or more and 70% less was evaluated as "B", 25% or more and 50% less was evaluated as "C", and 25% less was evaluated as "D". With respect to the swelling ratio, 45% less was evaluated as "A", 5% or more and 10% less was evaluated as "B", 10% or more and 20% less was evaluated as "C", and 20% or more was evaluated as "D". The result is shown in Table 1.

Embodiments 2 to 13

Except that instead of the compound represented by Chemical Formula 8, compounds shown in Table 1 were used as cyclic acid anhydrides, similarly to Embodiment 1, secondary cells were formed, and cycle characteristics were evaluated. The results are shown in Table 1.

Embodiments 14 to 26

Except that instead of polyimide, polyamide imide (PAI) marketed as "PYROMAX" manufactured by TOYOBO Co., Ltd. was used as the negative electrode binder and instead of the compound represented by Chemical Formula 8, compounds shown in Table 1 were used as cyclic acid anhydrides, similarly to Embodiment 1, secondary cells were formed, and cycle characteristics were evaluated. The results are shown in Table 1.

TABLE 1

| EMBODIMENT | NEGATIVE ELECTRODE ACTIVE MATERIAL SI/SIO$_X$/C (WEIGHT RATIO) | BINDER FOR NEGATIVE ELECTRODE | ACID ANHYDRIDE CHEMICAL FORMULA | DISPERSION OF Si IN SIO$_X$ | MAINTENANCE RATIO % | EVALUATION | SWELLING RATIO % | EVALUATION |
|---|---|---|---|---|---|---|---|---|
| 1 | 90/0/10 | PI | 8 | N | 53 | B | 5 | B |
| 2 | 90/0/10 | PI | 9 | N | 54 | B | 4 | B |
| 3 | 90/0/10 | PI | 12 | N | 56 | B | 5 | B |
| 4 | 90/0/10 | PI | 13 | N | 57 | B | 7 | B |
| 5 | 90/0/10 | PI | 14 | N | 55 | B | 7 | B |
| 6 | 90/0/10 | PI | 15 | N | 57 | B | 8 | B |
| 7 | 90/0/10 | PI | 16 | N | 56 | B | 7 | B |
| 8 | 90/0/10 | PI | 17 | N | 55 | B | 7 | B |
| 9 | 90/0/10 | PI | 20 | N | 58 | B | 8 | B |
| 10 | 90/0/10 | PI | 22 | N | 60 | B | 6 | B |
| 11 | 90/0/10 | PI | 23 | N | 61 | B | 6 | B |
| 12 | 90/0/10 | PI | 24 | N | 56 | B | 5 | B |
| 13 | 90/0/10 | PI | 25 | N | 55 | B | 6 | B |
| 14 | 90/0/10 | PAI | 8 | N | 64 | B | 5 | B |
| 15 | 90/0/10 | PAI | 9 | N | 63 | B | 7 | B |
| 16 | 90/0/10 | PAI | 12 | N | 66 | B | 7 | B |
| 17 | 90/0/10 | PAI | 13 | N | 67 | B | 5 | B |
| 18 | 90/0/10 | PAI | 14 | N | 67 | B | 7 | B |
| 19 | 90/0/10 | PAI | 15 | N | 71 | B | 8 | B |
| 20 | 90/0/10 | PAI | 16 | N | 70 | B | 6 | B |
| 21 | 90/0/10 | PAI | 17 | N | 71 | B | 8 | B |
| 22 | 90/0/10 | PAI | 20 | N | 68 | B | 6 | B |
| 23 | 90/0/10 | PAI | 22 | N | 68 | B | 6 | B |
| 24 | 90/0/10 | PAI | 23 | N | 70 | B | 8 | B |
| 25 | 90/0/10 | PAI | 24 | N | 71 | B | 7 | B |
| 26 | 90/0/10 | PAI | 25 | N | 71 | B | 5 | B |

Embodiments 27 to 39

As the negative electrode active material, in addition to silicon and black lead, amorphous silicon oxide (SiO$_x$ wherein 0<x≤2) was used at the mass ratio of silicon, amorphous silicon oxide, and black lead of 29:61:10, whereby a negative electrode active material was obtained like Embodiment 1. This obtained negative electrode active material contained silicon dispersed in silicon oxide, and was particles covered by carbon and having an average particle diameters D50 of 5 μm. Except that the obtained negative electrode active material was used, and instead of the compound represented by Chemical Formula 8, compounds represented in Table 2 were used, similarly to Embodiment 1, secondary cells were formed, and cycle characteristics were evaluated. The results are shown in Table 2. Also, with respect to embodiments using this negative electrode active material, in the sections "DISPERSION OF Si IN SiO$_x$" of table 2, "Y" was written.

Embodiments 40 to 52

Except that a negative electrode active material used in Embodiment 27 was used as the negative electrode active material, and instead of polyimide, polyamide imide (PAI) marketed "PYROMAX" manufactured by TOYOBO Co., Ltd. was used as the negative electrode binder, and instead of the compound represented by Chemical Formula 8, compounds shown in Table 2 were used as cyclic acid anhydrides, similarly to Embodiment 1, secondary cells were formed, and cycle characteristics were evaluated. The results are shown in Table 2.

TABLE 2

| EMBODIMENT | NEGATIVE ELECTRODE ACTIVE MATERIAL SI/SIO$_X$/C (WEIGHT RATIO) | BINDER FOR NEGATIVE ELECTRODE | ACID ANHYDRIDE CHEMICAL FORMULA | DISPERSION OF Si IN SIO$_X$ | MAINTENANCE RATIO % | EVALUATION | SWELLING RATIO % | EVALUATION |
|---|---|---|---|---|---|---|---|---|
| 27 | 29/61/10 | PI | 8 | Y | 58 | B | 5 | B |
| 28 | 29/61/10 | PI | 9 | Y | 57 | B | 7 | B |
| 29 | 29/61/10 | PI | 12 | Y | 59 | B | 6 | B |
| 30 | 29/61/10 | PI | 13 | Y | 63 | B | 6 | B |
| 31 | 29/61/10 | PI | 14 | Y | 62 | B | 7 | B |
| 32 | 29/61/10 | PI | 15 | Y | 59 | B | 7 | B |
| 33 | 29/61/10 | PI | 16 | Y | 61 | B | 7 | B |
| 34 | 29/61/10 | PI | 17 | Y | 60 | B | 7 | B |
| 35 | 29/61/10 | PI | 20 | Y | 61 | B | 7 | B |
| 36 | 29/61/10 | PI | 22 | Y | 62 | B | 7 | B |
| 37 | 29/61/10 | PI | 23 | Y | 60 | B | 7 | B |
| 38 | 29/61/10 | PI | 24 | Y | 57 | B | 7 | B |
| 39 | 29/61/10 | PI | 25 | Y | 58 | B | 7 | B |
| 40 | 29/61/10 | PAI | 8 | Y | 58 | B | 7 | B |
| 41 | 29/61/10 | PAI | 9 | Y | 62 | B | 7 | B |
| 42 | 29/61/10 | PAI | 12 | Y | 62 | B | 7 | B |

TABLE 2-continued

| EMBODIMENT | NEGATIVE ELECTRODE ACTIVE MATERIAL SI/SIO$_X$/C (WEIGHT RATIO) | BINDER FOR NEGATIVE ELECTRODE | ACID ANHYDRIDE CHEMICAL FORMULA | DISPERSION OF Si IN SIO$_X$ | MAINTENANCE RATIO % | EVALUATION | SWELLING RATIO % | EVALUATION |
|---|---|---|---|---|---|---|---|---|
| 43 | 29/61/10 | PAI | 13 | Y | 72 | B | 7 | B |
| 44 | 29/61/10 | PAI | 14 | Y | 73 | B | 7 | B |
| 45 | 29/61/10 | PAI | 15 | Y | 73 | B | 7 | B |
| 46 | 29/61/10 | PAI | 16 | Y | 75 | B | 7 | B |
| 47 | 29/61/10 | PAI | 17 | Y | 73 | B | 7 | B |
| 48 | 29/61/10 | PAI | 20 | Y | 74 | B | 7 | B |
| 49 | 29/61/10 | PAI | 22 | Y | 74 | B | 7 | B |
| 50 | 29/61/10 | PAI | 23 | Y | 72 | B | 7 | B |
| 51 | 29/61/10 | PAI | 24 | Y | 75 | B | 7 | B |
| 52 | 29/61/10 | PAI | 25 | Y | 73 | B | 7 | B |

Comparative Example 1

Except that any cyclic acid anhydride was not added in the electrolytic solution, similarly to Embodiment 1, a secondary cell was formed, and the cycle characteristic was evaluated. The result is shown in Table 3.

Comparative Examples 2 to 4

Except that instead of the compound represented by Chemical Formula 8, succinic anhydride, phthalic anhydride, and benzoic anhydride each were used as the cyclic acid anhydride, similarly to Embodiment 1, secondary cells were formed, and the cycle characteristic was evaluated. The results are shown in Table 3.

Comparative Example 5

Except that any cyclic acid anhydride was not added in the electrolytic solution, similarly to Embodiment 14, a secondary cell was formed, and the cycle characteristic was evaluated. The result is shown in Table 3.

Comparative Examples 6 to 8

Except that instead of the compound represented by Chemical Formula 8, succinic anhydride, phthalic anhydride, and benzoic anhydride each were used as the cyclic acid anhydride, similarly to Embodiment 14, secondary cells were formed, and the cycle characteristic was evaluated. The results are shown in Table 3.

Comparative Example 9

Except that any cyclic acid anhydride was not added in the electrolytic solution, similarly to Embodiment 27, a secondary cell was formed, and the cycle characteristic was evaluated. The result is shown in Table 3.

Comparative Examples 10 to 12

Except that instead of the compound represented by Chemical Formula 8, succinic anhydride, phthalic anhydride, and benzoic anhydride each were used as the cyclic acid anhydride, similarly to Embodiment 27, secondary cells were formed, and the cycle characteristic was evaluated. The results are shown in Table 3.

Comparative Example 13

Except that any cyclic acid anhydride was not added in the electrolytic solution, similarly to Embodiment 40, a secondary cell was formed, and the cycle characteristic was evaluated. The result is shown in Table 3.

Comparative Examples 14 to 16

Except that instead of the compound represented by Chemical Formula 8, succinic anhydride, phthalic anhydride, and benzoic anhydride each were used as the cyclic acid anhydride, similarly to Embodiment 40, secondary cells were formed, and the cycle characteristic was evaluated. The results are shown in Table 3.

TABLE 3

| COMPARATIVE EXAMPLE | NEGATIVE ELECTRODE ACTIVE MATERIAL SI/SIO$_X$/C (WEIGHT RATIO) | BINDER FOR NEGATIVE ELECTRODE | ACID ANHYDRIDE | DISPERSION OF Si IN SIO$_X$ | MAINTENANCE RATIO % | EVALUATION | SWELLING RATIO % | EVALUATION |
|---|---|---|---|---|---|---|---|---|
| 1 | 90/0/10 | PI | NONE | N | 41 | C | 23 | D |
| 2 | 90/0/10 | PI | SUCCINIC ANHYDRIDE | N | 44 | C | 20 | C |
| 3 | 90/0/10 | PI | PHTHALIC ANHYDRIDE | N | 43 | C | 19 | C |
| 4 | 90/0/10 | PI | BENZOIC ANHYDRIDE | N | 44 | C | 18 | C |
| 5 | 90/0/10 | PAI | NONE | N | 40 | C | 19 | C |
| 6 | 90/0/10 | PAI | SUCCINIC ANHYDRIDE | N | 43 | C | 25 | D |
| 7 | 90/0/10 | PAI | PHTHALIC ANHYDRIDE | N | 45 | C | 19 | C |

TABLE 3-continued

| COMPARATIVE EXAMPLE | NEGATIVE ELECTRODE ACTIVE MATERIAL SI/SIO$_X$/C (WEIGHT RATIO) | BINDER FOR NEGATIVE ELECTRODE | ACID ANHYDRIDE | DISPERSION OF Si IN SIO$_X$ | MAINTENANCE RATIO % | MAINTENANCE RATIO EVALUATION | SWELLING RATIO % | SWELLING RATIO EVALUATION |
|---|---|---|---|---|---|---|---|---|
| 8 | 90/0/10 | PAI | BENZOIC ANHYDRIDE | N | 44 | C | 18 | C |
| 9 | 29/61/10 | PI | NONE | Y | 42 | C | 24 | D |
| 10 | 29/61/10 | PI | SUCCINIC ANHYDRIDE | Y | 44 | C | 18 | C |
| 11 | 29/61/10 | PI | PHTHALIC ANHYDRIDE | Y | 43 | C | 17 | C |
| 12 | 29/61/10 | PI | BENZOIC ANHYDRIDE | Y | 44 | C | 18 | C |
| 13 | 29/61/10 | PAI | NONE | Y | 42 | C | 27 | D |
| 14 | 29/61/10 | PAI | SUCCINIC ANHYDRIDE | Y | 45 | C | 19 | C |
| 15 | 29/61/10 | PAI | PHTHALIC ANHYDRIDE | Y | 44 | C | 18 | C |
| 16 | 29/61/10 | PAI | BENZOIC ANHYDRIDE | Y | 43 | C | 17 | C |

From the results, it can be seen that the swelling ratios of secondary cells of Embodiments at 60° C. were reduced as compared to the secondary cells of Comparative Examples and the lithium secondary cells of the present invention were excellent in the cycle characteristics.

This application includes all contents of Japanese Patent Application No. 2011-139722 filed on Jun. 23, 2011, and Japanese Patent Application No. 2012-129054 filed on Jun. 6, 2012.

INDUSTRIAL APPLICABILITY

The present invention can be used in various industrial fields requiring power supply and the industrial fields of transporting, storing and supplying electric energy. Specifically, the present invention can be used as a power supply for a mobile device such as a mobile telephone or a note PC, a power supply for driving a motor of a vehicle, and so on.

The invention claimed is:

1. A lithium secondary cell, including:
   a positive electrode active material layer containing a positive electrode active material;
   a negative electrode active material layer containing a negative electrode active material; and
   an electrolytic solution for immersing the positive electrode active material layer and the negative electrode active material layer,
   wherein the electrolytic solution contains a cyclic acid anhydride represented by the following Chemical Formula (1):

(1)

wherein R$^1$ and R$^2$ independently represent a hydrogen atom, a halogen atom, an unsubstituted or substituted 1-12C hydrocarbon group, an unsubstituted or substituted 1-12C alkoxy group, or an unsubstituted or substituted alkylamino group,
   wherein the negative electrode active material includes silicon, silicon oxide, and a carbon-based material, and the negative electrode active material layer is formed by integrally binding the negative electrode active material by a binder including one or more selected from the group consisting of polyimide and polyamide imide,
   wherein the electrolytic solution contains the cyclic acid anhydride within a range from 0.1 weight percent to 2.0 weight percent, and
   wherein the cyclic acid anhydride represented by the chemical formula comprises one or more selected from the group consisting of the cyclic acid anhydride represented by the following Chemical Formulae (5) to (25):

(5)

(6)

(7)

(8)

(9)

(10)

(11)

(12)

(13)

(14)

(15)

(16)

(17)

(18)

(19)

(20)

(21)

(22)

(23)

-continued (24)

(25)

2. The lithium secondary cell according to claim 1, wherein the negative electrode active material layer contains one or more selected from the group consisting of aluminum, lead, tin, indium, bismuth, silver, barium, calcium, mercury, palladium, platinum, tellurium, zinc, lanthanum, aluminum oxide, tin oxide, indium oxide, zinc oxide, and lithium oxide.

3. The lithium secondary cell according to claim 1, wherein the negative electrode active material comprises one or more selected from the group consisting of silicon, aluminum, lead, tin, indium, bismuth, silver, barium, calcium, mercury, palladium, platinum, tellurium, zinc, and lanthanum dispersed in one or more selected from the group consisting of silicon oxide, aluminum oxide, tin oxide, indium oxide, zinc oxide, and lithium oxide.

4. The lithium secondary cell according to claim 1, wherein one or more selected from the group consisting of silicon oxide, aluminum oxide, tin oxide, indium oxide, zinc oxide, and lithium oxide have at least partially an amorphous structure.

5. The lithium secondary cell according to claim 1, wherein the lithium secondary cell is laminated.

6. The lithium secondary cell according to claim 1, wherein at least one of $R^1$ and $R^2$, in the cyclic acid anhydride represented by Chemical Formula 1, is other than the hydrogen atom.

* * * * *